C. A. BODDIE.
ELECTRICAL MEASURING INSTRUMENT.
APPLICATION FILED JUNE 5, 1913.

1,206,293.

Patented Nov. 28, 1916
2 SHEETS—SHEET 1.

WITNESSES:

INVENTOR
Clarence A. Boddie
BY
ATTORNEY

C. A. BODDIE.
ELECTRICAL MEASURING INSTRUMENT.
APPLICATION FILED JUNE 5, 1913.
1,206,293.
Patented Nov. 28, 1916.
2 SHEETS—SHEET 2.
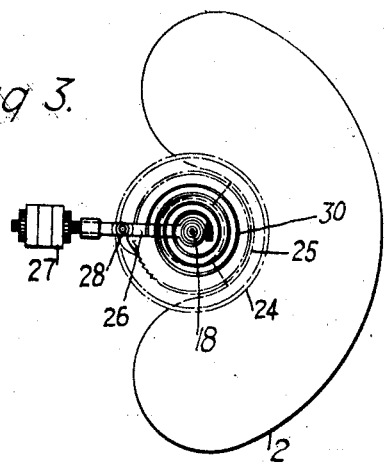
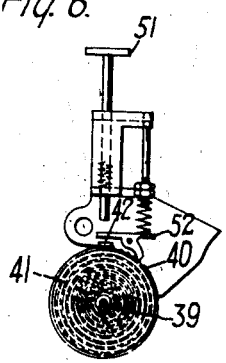
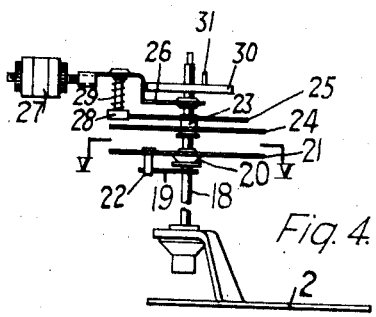
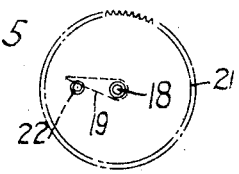
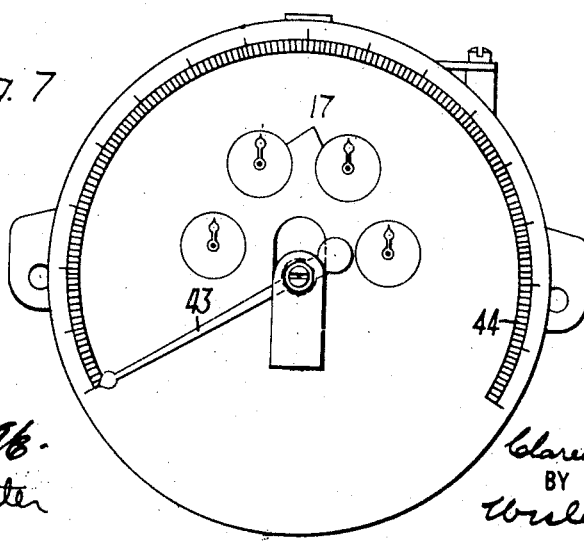
WITNESSES:
INVENTOR
Clarence A. Boddie
BY
Wiley G. Carr
ATTORNEY

UNITED STATES PATENT OFFICE.

CLARENCE A. BODDIE, OF PITTSBURGH, PENNSYLVANIA, ASSIGNOR TO WESTINGHOUSE ELECTRIC AND MANUFACTURING COMPANY, A CORPORATION OF PENNSYLVANIA.

ELECTRICAL MEASURING INSTRUMENT.

1,206,293.   Specification of Letters Patent.   Patented Nov. 28, 1916.

Application filed June 5, 1913. Serial No. 771,883.

*To all whom it may concern:*

Be it known that I, CLARENCE A. BODDIE, a citizen of the United States, and a resident of Pittsburgh, in the county of Allegheny and State of Pennsylvania, have invented a new and useful Improvement in Electrical Measuring Instruments, of which the following is a specification.

My invention relates to electrical measuring instruments and particularly to maximum demand wattmeters.

The object of my invention is to provide a maximum demand wattmeter that will indicate the true maximum reading by means of a pointer on a circular scale; the meter to operate without clock mechanism and to be of such a construction that it shall be of minimum size.

A means for indicating the maximum demand without the use of clock work mechanism is disclosed in my U. S. application, Serial No. 687,395, filed March 30, 1912.

The device disclosed comprises an indicating pointer that travels over a curved scale of a short length to indicate the sum of the maximum demands of each day subsequent to the last setting of the pointer. The two moving elements are mounted on opposite sides of the magnetizable core member which necessitates a large instrument case. The average maximum demand may be determined by an instrument of this type by dividing the indicated reading by the number of days run subsequent to the last resetting of the pointer.

My present invention provides means for indicating the true maximum demand for any length of time without the necessity of further computations, and it is applicable to any type of alternating current wattmeter without unduly enlarging its case.

My invention further provides a circular scale of relatively great length.

Figure 1:
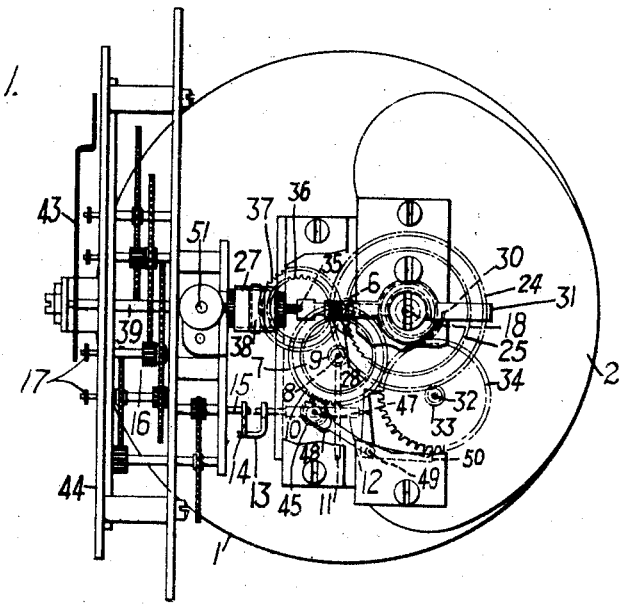
Figure 2:
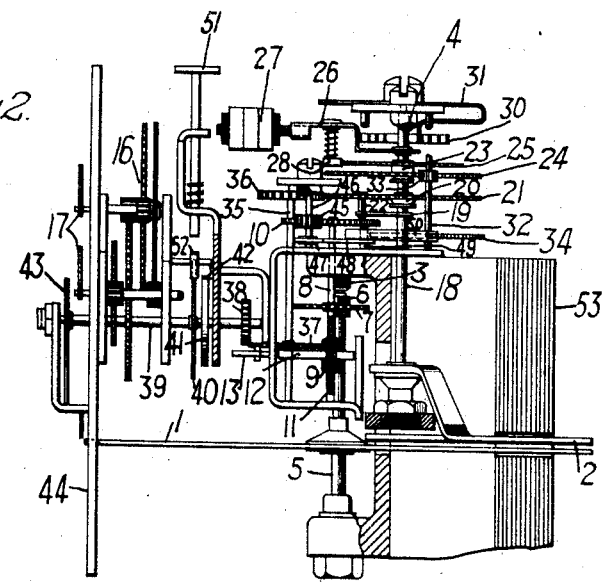

In the accompanying drawings, Figure 1 is a plan view of a maximum demand instrument embodying my invention; Fig. 2 is a view, partially in elevation and partially in section of the instrument shown in Fig. 1; Fig. 3 is a plan view of the maximum demand movable element employed in my invention; Fig. 4 is an elevational view of the maximum demand movable element employed in my invention; Fig. 5 is a view taken on the line V—V of Fig. 4; Fig. 6 is a front elevational view of the releasing mechanism, and Fig. 7 is a front elevational view of the dials and pointers employed in my invention.

An electrical measuring instrument is provided with a main armature 1 and an auxiliary armature 2 that operate a main mechanism 3 and an auxiliary mechanism 4, respectively. A controlling mechanism is also provided for interlocking the mechanisms 3 and 4, as hereinafter described.

The armature 1 is mounted on a shaft 5 that is also provided with a pinion 6 which engages a gear wheel 7 that is mounted on a shaft 8. A worm wheel 9 and a gear wheel 10 are also mounted on the shaft 8 and the worm wheel 9 engages a gear wheel 11 that is mounted on an arbor 12. The arbor 12 is provided with a crank arm 13 which engages an arm 14 that is carried by an arbor 15. The arbor 15 is adapted to drive an integrating train of gear wheels 16 that are provided with a plurality of pointers 17.

The armature 2 is mounted on a shaft 18 that is disposed in close proximity to the shaft 5 and on the same side of the magnetizable core member of the instrument. The shaft 18 is provided with an arm 19 and a loosely mounted sleeve 20. The sleeve 20 has mounted thereon a gear wheel 21 having a downwardly projecting pin 22 therein for engaging the arm 19. A second sleeve 23 is loosely mounted on the shaft 18 and is provided with a gear wheel 24 and a ratchet wheel 25. A counterweight arm 26 is mounted on the shaft 18 and is provided with a counter-weight and a pawl 28 and a helical spring member 27, a pawl 28 and a helical spring 29 for insuring engagement between the pawl 28 and the ratchet wheel 25. A spiral spring 30 is connected, at one of its ends, to the arm 26 and, at its other end, to a stationary member 31.

An arbor 32 is provided with a pinion 33 and an escapement wheel 34, the pinion 33 being adapted to engage the gear wheel 24 that is mounted on the sleeve 23. A shaft 35 is provided having a pinion 36 and a spur gear wheel 37 that engage the gear wheel 21 and a spur gear wheel 38, respectively. The gear wheel 38 is mounted on a shaft 39 that is also provided with a ratchet wheel 40. The shaft 39 is disposed at right angles to the shaft 35 and has attached thereto one end of a spring 41, the other end of which is attached to a stationary member 42. The shaft 39 is also provided with a maximum-demand pointer 43 that coöperates with a scale 44 to indicate the true maximum demand.

The gear wheel 10 engages a pinion 45 that is mounted on an arbor 46 which is also provided with an eccentric 47. The eccentric 47 actuates an eccentric strap or lever 48 that is mounted on an arbor 49 with a double pallet 50 which limits the movement of the maximum-demand pointer through the escapement wheel 34.

A push button 51 is adapted to release a pawl 50 that engages the ratchet wheel 40 for the purpose of allowing the spring 41 to rotate the pointer 43 to its initial position at any time.

If the magnetizable core member 53 of the instrument is energized in the usual manner, my invention operates as follows: The armature 1 rotates, transmitting its motion through the shaft 5, the pinion 6, the shaft 8, the gear wheel 7, the shaft 12, the worm wheel 9, the gear wheel 11, the arbor 12, the crank 13, the lever 14 and the shaft 15 to the integrating mechanism 16 and the pointers 17, which indicate the integrated value of the energy being measured. Since the armatures 1 and 2 are disposed in the same magnetic field, the armature 2 will tend to rotate and to transmit its motion through the arm 19, pin 22, the gear wheel 21, the gear wheel 36, the shaft 35, the gear wheel 37, the gear wheel 38 and the shaft 39 to the pointer 43 to indicate the instantaneous variations in the power. However, the shaft 18 is prevented from rotating at random and is only permitted to rotate after the force tending to rotate the same has existed for a definite period of time, it being controlled by the controlling mechanism operated by the main mechanism 3.

The rotation of the armature 1 causes the shaft 8 to rotate and this, in turn, rotates the shaft 46 that causes the double pallet 48 to be actuated at a rate proportional to the integrated value of the power being measured. Thus, the escapement wheel 34 is permitted to move in accordance with the speed of rotation of the armature 1. When the escapement wheel 34 is released a notch, the resulting movement of the pinion 33, the gear wheel 24, the ratchet 25 and the arm 26 permits the shaft 18, and likewise the arm 19, to be moved. The arm 19 engages the pin 22 and, consequently, the gear wheel 21 is rotated to actuate the pointer 43, as hereinbefore described. The higher the speed of rotation of the armature 1, the greater will be the tendency for the armature 2 to rotate, thus, the pallet 50 will be operated more rapidly and allow the pointer 43 to move a greater distance.

When the power being measured decreases, the armatures 1 and 2 have less tendency to rotate and, if the power decreases to such an extent that the spring 30 overcomes the force tending to rotate the armature 2, the shaft 18 will be rotated in a direction opposite to its normal direction of rotation, and the arm 19 and the pin 22 will disengage. As the shaft 18 rotates in its counter-direction of rotation, the pawl 28 rides over the teeth of the ratchet wheel 25 but the pointer 43, the shaft 39, the gear wheels 21, 36, 37 and 38 remain stationary, being held in such position by the pawl 53.

When the power being measured again increases, the armature 2 and, consequently, the shaft 18 again rotate under a restricted motion until the arm 19 engages the pin 22, which will be at a place representing the position of the last maximum demand. It will be understood that the notching-up operation has no effect upon the maximum-demand pointer until the arm 19 again engages the pin 22. If the demand exceeds the last maximum demand, the pointer 42 will be advanced to indicate in the same manner as hereinbefore described.

When the meter is read at definite intervals, the button 51 may be depressed to release the pawl 52 which, as hereinbefore explained, moves the pointer 43 to its initial position. The resetting of the pointer 43 also causes the sleeve 20 to be rotated to its initial position or to such position that the pin 22 engages the arm 19.

My invention is not limited to the particular construction illustrated but may be variously modified within the scope of the appended claims.

I claim as my invention:

1. In an electrical measuring instrument, the combination with a main and an auxiliary mechanism, and a single means for simultaneously and independently actuating the said mechanisms, of means interposed between the said mechanisms whereby one controls the operation of the other, and means for returning the controlled mechanism to its initial position under predetermined conditions.

2. In an electrical measuring instrument, the combination with a main and an auxiliary mechanism, and a single means for simultaneously and independently actuating the said mechanisms, of means interposed between the said mechanisms whereby one controls the operation of the other, and means for returning one of the said mechanisms to its initial position under predetermined conditions.

3. In an electrical measuring instrument, the combination with a main and an auxiliary mechanism, and a single means for simultaneously and independently actuating the said mechanisms, of means interposed between the said mechanisms whereby the main mechanism controls the time required for the auxiliary mechanism to operate, and means for returning the said auxiliary mechanism to its initial position under predetermined conditions.

4. A wattmeter comprising two armature elements, means for simultaneously applying thereto similar actuating forces, integrating and indicating mechanisms associated respectively with said armature elements, means whereby the integrating armature element controls the operation of the indicating mechanism, and means for returning one of the armature elements to its initial position when the actuating force is removed.

5. A wattmeter comprising a main and an auxiliary mechanism, means for simultaneously applying to said mechanisms similar actuating forces, a controlling mechanism disposed between said main and said auxiliary mechanisms for controlling the operation of said auxiliary mechanism, and a resetting mechanism for returning a part of said auxiliary mechanism to its initial position when the actuating forces are removed.

6. A wattmeter comprising a main and an auxiliary mechanism, means for simultaneously applying to said mechanisms similar actuating forces, a controlling mechanism disposed between said main and said auxiliary mechanism for controlling the operation of said auxiliary mechanism, an automatic resetting mechanism for returning a part of the said auxiliary mechanism to its initial position when the actuating forces are removed, and means for manually resetting the other part of the said auxiliary mechanism.

7. In an electric measuring instrument, the combination with two rotatable members, a magnetizable core member, said rotatable members disposed on one side of said magnetizable core member, an integrating mechanism operatively connected to one of said rotatable members, an indicating mechanism operatively connected to the other of said rotatable members and a controlling mechanism disposed between said integrating and indicating mechanism, of means for automatically rotating one of said rotatable members to its initial position when the magnetizable core member is deënergized.

8. An electrical measuring instrument comprising a main rotatable member, an auxiliary rotatable member, an integrating mechanism operatively connected to said main rotatable member, an auxiliary mechanism operatively connected to said auxiliary rotatable member, an indicating pointer operated by said auxiliary mechanism, means operated by the said main rotatable member for controlling the rotation of the said auxiliary rotatable member, means for retaining said indicating pointer in any position, and resilient means for automatically rotating said auxiliary rotatable member to its initial position.

9. A measuring instrument comprising a main rotatable member, an auxiliary rotatable member, an indicating member, means for connecting said auxiliary rotatable member to said indicating member, an escapement device operated by said main rotatable member for controlling the said indicating member, a pawl for retaining the said indicating member in any position, and means for disconnecting said indicating member from said auxiliary rotatable member and for rotating said auxiliary rotatable member in a direction opposite to its normal direction of rotation.

10. An electrical measuring instrument comprising a shaft, an armature mounted thereon, an integrating mechanism driven by said shaft, a controlling mechanism also driven by said shaft, a second armature, a second shaft, both shafts being on the same side of the instrument and in close proximity to each other, a second mechanism operated by said second shaft, a pointer, means for rotating said second armature to its initial position when the meter is not operating, means for retaining the said pointer in its maximum position, and means for rotating said pointer to its initial position.

11. In an electrical measuring instrument, the combination with an integrating mechanism, and a controlling mechanism operatively connected to said integrating mechanism, of an indicating mechanism comprising an armature, a shaft, a sleeve loosely mounted on said shaft, means for operatively connecting said shaft to said sleeve, a pointer operatively connected to said sleeve, a second sleeve loosely mounted on said shaft, means for operating said second sleeve, means for operatively connecting said second sleeve to said controlling mechanism, means for rotating the said armature to its initial position when said instrument is not operating, means for retaining the indicating pointer in its maximum position, and means for manually releasing said pointer.

12. An electrical measuring instrument, comprising an armature, a shaft for said armature, an integrating mechanism driven by said shaft, a second armature, a second shaft, both shafts being on the same side of the instrument and in close proximity to each other, a loosely mounted gear wheel on said second shaft, an arm on said second shaft for operating said loosely mounted gear wheel, an indicating pointer, said wheel being operatively connected to said indicating pointer, a sleeve loosely mounted on said second shaft, a ratchet wheel and a gear wheel mounted on said sleeve, a pawl connected to said second shaft for driving said sleeve, an escapement wheel operatively connected to said sleeve, a double pallet operatively connected to said first shaft for controlling the said escapement wheel, means for rotating the second armature to its initial position when the meter is not operating, means for retaining the said pointer in its maximum position, and means for releasing said pointer.

13. In an electrical measuring instrument, the combination with two movable armatures and a single means for simultaneously actuating the same, of means interposed between the said armatures whereby one controls the operation of the other, and means for returning one of the said armatures to its initial position under predetermined conditions.

14. In an electrical measuring instrument, the combination with two movable members and means for applying to the said movable members similar actuating forces, of a mechanism for each of the movable members, means *en train* between the said mechanisms whereby one controls the other, and means whereby a part of one of the mechanisms returns to its initial position at predetermined times.

15. A wattmeter comprising a main and an auxiliary mechanism, means for independently applying to the said mechanisms similar actuating forces, means connected between the said mechanisms whereby one mechanism controls the other and means for returning a part of one of the mechanisms to its initial position under predetermined conditions.

16. In an electrical measuring instrument, the combination with a main and an auxiliary mechanism, and a single means for simultaneously and independently actuating the said mechanisms, of means interposed between the said mechanisms whereby one mechanism controls the time required for the other mechanism to operate, and means for returning one of the said mechanisms to its initial position under predetermined conditions.

In testimony whereof, I have hereunto subscribed my name this 28th day of May 1913.

CLARENCE A. BODDIE.

Witnesses:
WILLIAM A. DARRAH,
B. B. HINES.